United States Patent
Cross et al.

(10) Patent No.: US 9,228,083 B1
(45) Date of Patent: *Jan. 5, 2016

(54) MULTIFUNCTIONAL ADDITIVES IN ENGINEERING THERMOPLASTICS

(71) Applicant: CYTEC TECHNOLOGY CORP., Wilmington, DE (US)

(72) Inventors: Paul Mark Cross, York (GB); Richard Thomas Price, Corona, CA (US); Dominique Ponsolle, Winona, MN (US); Patrick Terence McGrail, Saltburn (GB)

(73) Assignee: Cytec Technology Corp., Wilmington, DE (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/166,931

(22) Filed: Jan. 29, 2014

Related U.S. Application Data

(63) Continuation of application No. 12/971,542, filed on Dec. 17, 2010, now Pat. No. 8,685,871.

(60) Provisional application No. 61/287,632, filed on Dec. 17, 2009.

(51) Int. Cl.
| | |
|---|---|
| *C08G 59/50* | (2006.01) |
| *C08G 59/56* | (2006.01) |
| *C08L 61/02* | (2006.01) |
| *C08L 65/02* | (2006.01) |
| *C08L 71/12* | (2006.01) |
| *C08L 81/06* | (2006.01) |
| *C08G 59/40* | (2006.01) |
| *C08L 63/00* | (2006.01) |

(52) U.S. Cl.
CPC ............ *C08L 71/12* (2013.01); *C08G 59/4021* (2013.01); *C08G 59/5033* (2013.01); *C08L 61/02* (2013.01); *C08L 65/02* (2013.01); *C08L 81/06* (2013.01)

(58) Field of Classification Search
None
See application file for complete search history.

(56) References Cited

U.S. PATENT DOCUMENTS

| | | | | |
|---|---|---|---|---|
| 4,735,833 | A * | 4/1988 | Chiotis et al. | 428/34.5 |
| 4,999,238 | A | 3/1991 | Gawin | |
| 6,265,498 | B1 | 7/2001 | Wang et al. | |
| 8,084,126 | B2 * | 12/2011 | Steele et al. | 428/364 |
| 8,685,871 | B2 * | 4/2014 | Cross et al. | 442/414 |
| 2006/0252334 | A1 * | 11/2006 | LoFaro et al. | 442/400 |

FOREIGN PATENT DOCUMENTS

| | | |
|---|---|---|
| EP | 0525418 A1 | 2/1993 |
| EP | 0723994 A1 | 7/1996 |
| JP | 2002-146060 A * | 5/2002 |
| JP | 2008-13711 A * | 1/2008 |

OTHER PUBLICATIONS

International Search Report and Written Opinion for PCT/US2010/060730 mailed May 2, 2011.*

* cited by examiner

*Primary Examiner* — Robert Sellers
(74) *Attorney, Agent, or Firm* — Thi D. Dang

(57) ABSTRACT

A thermoplastic polymer toughening material in the form of polymeric fibers produced by mixing at least one epoxy curing agent and a thermoplastic polyaromatic polymer to form an admixture, and producing polymeric fibers from the admixture, wherein the thermoplastic polymer toughening material does not include an epoxy resin, and is soluble in an epoxy resin at a temperature lower than a dissolving temperature required by the thermoplastic polymer toughening material without epoxy curing agent.

4 Claims, 12 Drawing Sheets

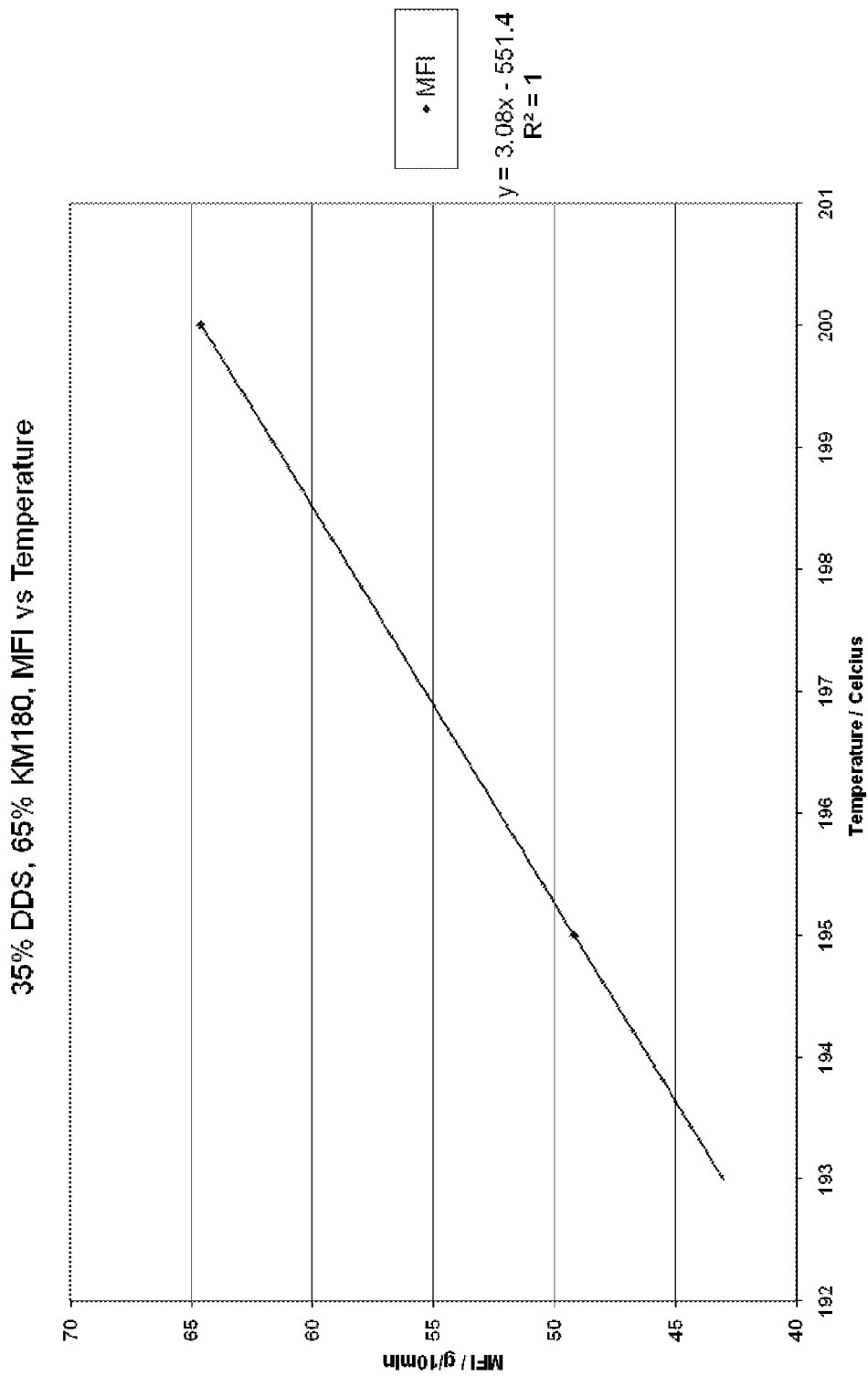

MULTIFUNCTIONAL ADDITIVES IN ENGINEERING THERMOPLASTICS

This application is a continuation application of U.S. application Ser. No. 12/971,542 filed on Dec. 17, 2010, now U.S. Pat. No. 8,685,871, which claims the benefit of prior U.S. Provisional Application No. 61/287,632 filed on Dec. 17, 2009, both of which are incorporated herein by reference in their entirety.

BACKGROUND OF THE INVENTION

1. Field of Invention

Embodiments of the present disclosure pertain to resin infusion and polymer processing for composite manufacturing and, in particular, to a combination of an epoxy curing agent and an engineering thermoplastic.

2. Description of the Related Art

Fiber-reinforced polymer matrix composites (PMCs) are high-performance structural materials that are commonly used in applications requiring resistance to aggressive environments, high strength, and/or low weight. Examples of such applications include aircraft components (e.g., tails, wings, fuselages, and propellers), high performance automobiles, boat hulls, and bicycle frames. PMCs comprise layers of structural reinforcement fibers that are bonded together with a matrix material, such as a polymer resin. The structural reinforcement fibers reinforce the matrix, bearing the majority of the load supported by the composite, while the matrix bears a minority portion of the load supported by the composite and also transfers load from broken fibers to intact fibers. In this manner, PMCs may support greater loads than either the matrix or fiber may support alone. Furthermore, by tailoring the structural reinforcement fibers in a particular geometry or orientation, the composite can be efficiently designed to minimize weight and volume while maximizing strength and performance.

Numerous processes have been developed for the manufacture of PMCs. These include Liquid Molding (LM) and preimpregnated prepregs (prepregs).

Conventional Prepregs incorporate sheets of structural reinforcement fibers that are wetted, impregnated, with a matrix resin. These prepregs are then layered onto each other in a particular orientation on a tool to form a laminate where they are then subjected to heat and pressure in an autoclave to cure the prepreg layup into the final composite.

The Liquid Molding approach differs from that of conventional prepreg in that dry structural reinforcement fibers are placed into a mold cavity or other mechanism for net-shape tooling and a matrix resin is injected or infused into the structural reinforcement fibers. Liquid Molding (LM) is a generic term which covers processing techniques such as Resin Transfer Molding (RTM), Liquid Resin Infusion (LRI), Resin Infusion under Flexible Tooling (RIFT), Vacuum Assisted Resin Transfer Molding (VARTM), Resin Film Infusion (RFI) and the like. The potential benefits of LM over a conventional prepreg route include reduced lay-up time, a non-dependence on prepreg tack and drape and increased shelf life properties. In practice, the use of LM technology finds its greatest use in specialized operations in which complex composite structures (multi components) are required, locally strengthened structures are required by selectively distributing carbon fibers in the mold and where the need for very large structures is required e.g., marine applications.

Resin Film Infusion (RFI) is a technique that combines an LM technology with conventional prepreg, e.g., in RTM or RFI autoclave curing, where individual prepregs are stacked in a prescribed orientation to form a laminate, the laminate is laid against a smooth metal plate and covered with successive layers of porous Teflon®, bleeder fabric and vacuum bag. A consolidating pressure is applied to the laminate, to consolidate the individual layers and compress bubbles of any volatile that remain.

The use of an autoclave creates a limit to the size of the components that is possible to produce, however. For example, it is not possible to build large structures such as a boat hull, an aircraft wing or fuselage, or a bridge, using an autoclave because that would require an equally large autoclave adding enormous capital costs and running costs.

VARTM simplifies hard mold RTM by employing only one-sided molds, and using vacuum bagging techniques to compress the preform. However mold filling times can be far too long, if indeed the resin does not cure before total fill.

RIFT provides much faster fill times. A distribution media, that is, a porous layer having very low flow resistance, provides the injected resin with a relatively easy flow path. The resin flows quickly through the distribution media, which is placed on the top of the laminate and then flows down through the thickness of the preform. The use of fibers to create channels for the resin infusion is known (WO0102146A1 (Plastech), U.S. Pat. No. 5,484,642 (Brochier), U.S. Pat. No. 5,326,462 (Seemann)) however these channels are either removed during the degassing and curing stage or if they are left in they remain intact post cure.

The matrix resins require various mechanical properties in a final composite including strength and toughness. While most thermosetting polymers result in sufficient strength, they are often brittle and their toughness or resistance to damage is low. As a result, numerous methods have been employed to increase toughness over the years including the incorporation of tough thermoplastics into the matrix resin. For conventional prepreg systems the thermoplastic can be added directly into the matrix resin and then impregnated into the structural reinforcement fibers. However, thermoplastics increase the viscosity of the matrix and increase the difficulty of prepreg manufacturing. In addition, the increased matrix resin viscosity makes LM using thermoplastic toughened matrix resins unmanageable because the high viscosity resin is too difficult to inject into the structural reinforcement fibers.

Additionally, although many thermoplastics are tough, ductile materials, their use in aerospace structural materials has been minimal for several reasons. First, many thermoplastics do not have the solvent resistance, thermal stability, and high softening points required for demanding aerospace applications. Second, the high temperature engineering thermoplastics are difficult to process; often requiring both high temperature and pressure to produce acceptable carbon fiber reinforced composite parts. Therefore, because thermoplastic polymers are subject to high temperature degradation there is a narrow processing temperature window between the processing temperature and the temperature at which the thermoplastic degrades.

Due to the difficulty of incorporating thermoplastics into resins for resin infusion applications, various attempts have been made to separate the beneficial thermoplastic toughening element from the resin. These include the use of thermoplastic veils, fibers and mats integrated within the preform, thus allowing the infused resin to be free, or virtually, free of thermoplastic. These thermoplastic toughening elements incorporated within the preform can be insoluble or soluble when the resin is infused.

When resin soluble thermoplastics are incorporated within the preform, the thermoplastic will only dissolve into the infused resin matrix when the resin system is heated to the dissolution temperature of the soluble fiber. Further, because the dissolution temperature of soluble fiber may be high, the temperature may reach a point that will cause the soluble fiber to degrade.

Another drawback of the liquid molding resin infusion technique is that matrix resin in conventional resin systems must contain the curing agent for the epoxy resin thermosetting system. By requiring the epoxy curing agent in the resin itself, the combination of the resin and epoxy curing agent result in a short pot life of the infusible resin.

Thus, there is a need in the art for a liquid molding resin infusion technique wherein the pot life of the resin is increased, the resin viscosity is lowered for injection and the dissolution temperature of a soluble thermoplastic fiber is lowered in the resin. Also, the soluble fiber processing temperature needs to be lowered, which would broaden the processing window to avoid degradation.

SUMMARY OF INVENTION

The present invention is a composition of a first epoxy curing agent and a thermoplastic, wherein the first epoxy curing agent is in an admixture with the thermoplastic.

The present invention further embodies a composite structure wherein the stability of the preform using a first epoxy curing agent and a thermoplastic is greater than the stability of a preform comprising a thermoplastic toughening agent comprising the thermoplastic without the epoxy curing agent.

Furthermore, the present invention may support a method of manufacturing a composite using an epoxy resin and dissolving a thermoplastic toughening agent with an epoxy curing agent in an epoxy resin at a temperature that is lower than a dissolving temperature required by a toughening agent of a thermoplastic without an epoxy curing agent. The method of manufacturing a composite may further include processing the composition at a temperature that is lower than a temperature required by a composition comprising the epoxy curing agent and the epoxy resin in admixture with the thermoplastic.

BRIEF DESCRIPTION OF THE DRAWINGS

FIG. 1C is a chart depicting the Melt Flow Index (MFI) (g/10 min) of a thermoplastic toughening agent versus temperature in ° C. of a sample of 35% of a 50:50 eutectic blend of 3'3 and 4'4 DDS and KM 180 PES:PEES copolymer

Figure 1A:
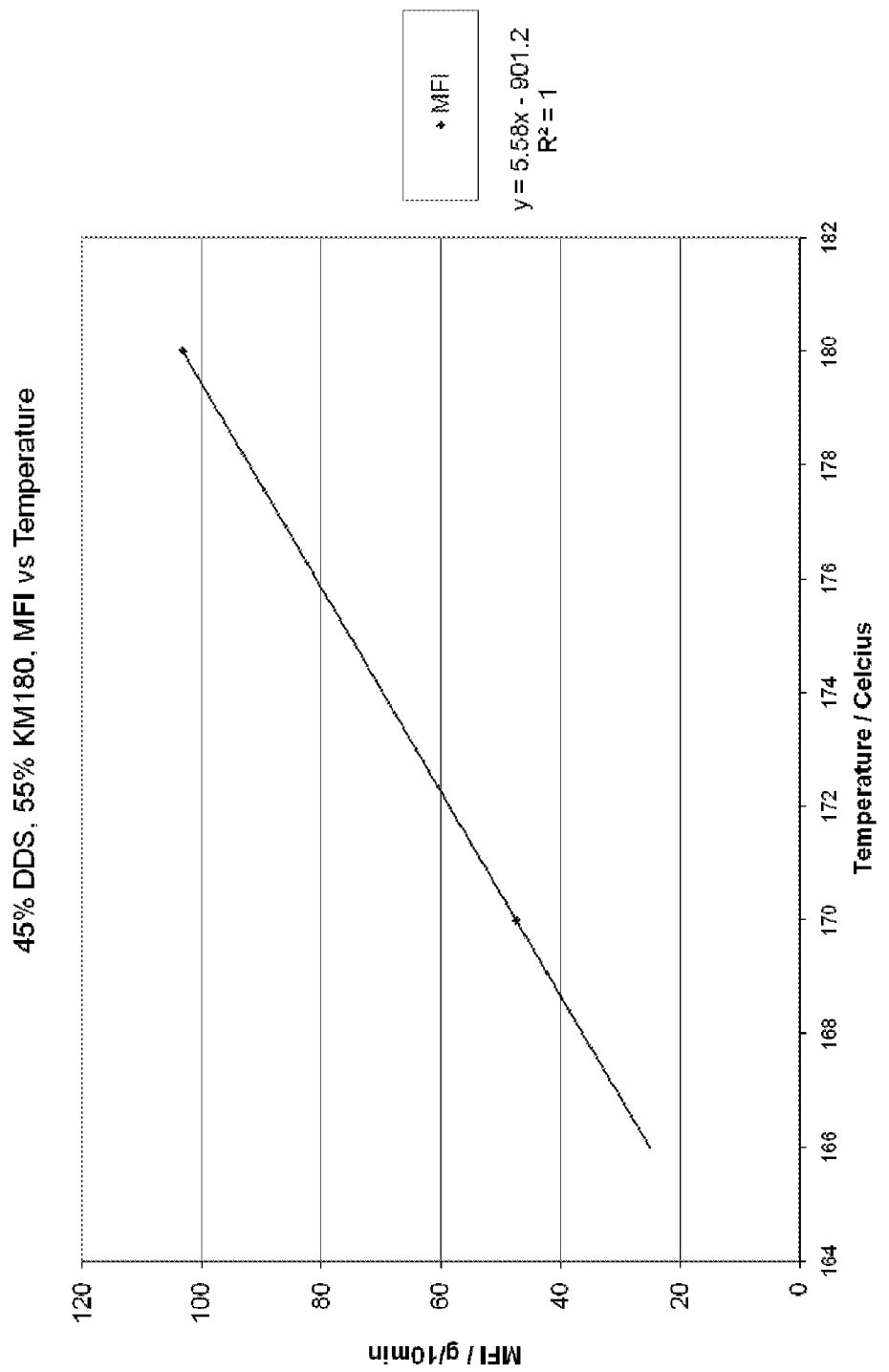
FIG. 1A is a chart depicting the Melt Flow Index (MFI) (g/10 min) of a thermoplastic toughening agent versus temperature in ° C. of a sample of 45% of a 50:50 eutectic blend of 3'3 and 4'4 diaminodiphenyl sulfone (DDS) by weight and 55% KM 180 PES:PEES copolymer.
Figure 1B:
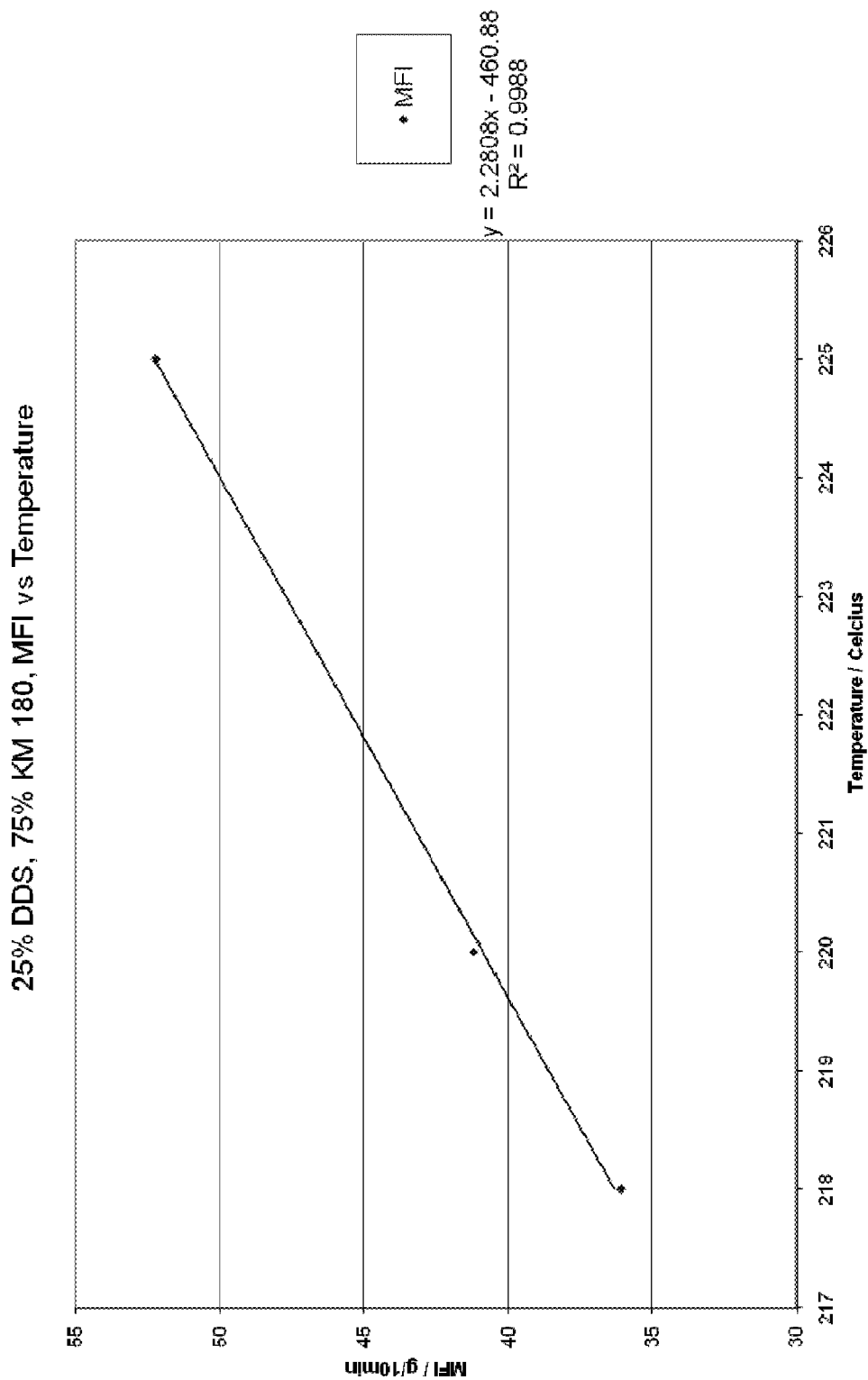
FIG. 1B is a chart depicting the Melt Flow Index (MFI) (g/10 min) of a thermoplastic toughening agent versus temperature in ° C. of a sample of 25% of a 50:50 eutectic blend of 3'3 and 4'4 DDS and KM 180 PES:PEES copolymer
Figure 1D:
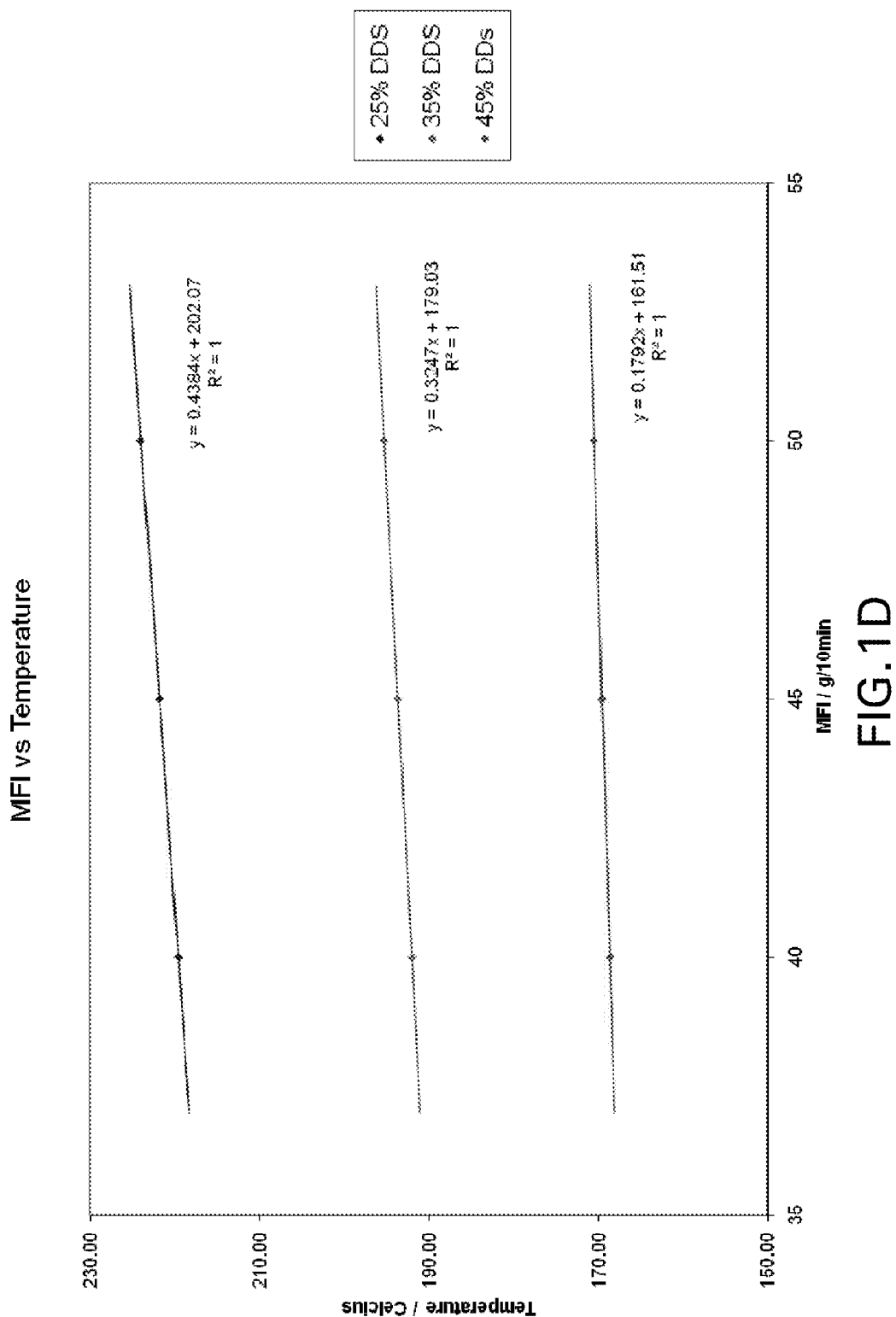
FIG. 1D is a chart depicting the Melt Flow Index (MFI) (g/10 min) of a thermoplastic toughening agent versus temperature in ° C. of a sample of 25%, 35% and 45% of a 50:50 eutectic blend of 3'3 and 4'4 DDS by weight.

DETAILED DESCRIPTION in certain embodiments, a soluble thermoplastic polymer toughening material in the form of soluble polymeric fibers is disclosed that allows epoxy resins to be injected into a preform that contains a structural reinforcement fiber such as a carbon fiber fabric interwoven with fibers of the soluble thermoplastic polymer toughening material. In one embodiment, the thermoplastic polymer toughening material comprises an epoxy curing agent. The epoxy curing agent may be a portion of or the entire total volume of epoxy curing agent in the resulting cured composite. In a further embodiment, the matrix resin does not include an epoxy curing agent.

The epoxy curing agent may be within the soluble fibers of the soluble thermoplastic polymer toughening material in the preform, allowing the epoxy matrix resins to be infused injected into complex shaped parts.

By removing the epoxy curing agents from the infusible matrix resin and placing it in the soluble thermoplastic polymer toughening material reduces the infusible matrix resin viscosity, increases the infusible matrix resin pot life, reduces the soluble thermoplastic polymer toughening material dissolution temperature, and broadens the soluble thermoplastic polymer toughening material processing window with reduced bulk.

In one embodiment, a 3'3 and/or 4'4 DDS as the curing agent is added into soluble thermoplastic polymer toughening material. The soluble thermoplastic polymer toughening material may be a polyether sulfone (PES) or a polyether ether sulfone (PEES) or a combination PES/PEES polymer.

In a further embodiment, an epoxy curing agent, such as 3'3 and/or 4'4 DDS is added to a soluble thermoplastic polymer toughening material, such as a PES/PEES polymer. This will increase pot life of the infusible matrix resin: The term "pot life" as used herein has its ordinary meaning as known to those skilled in the art and includes the pre-gelling time of the infusible matrix resin. Thus, the pot life includes the amount of time before the resin reaches a certain viscosity that exceeds that which is practical for liquid molding resin infusion. The preferred viscosity is less than about 500 cps.

The "initial viscosity" of the epoxy matrix resin or the "viscosity of the injecting resin" includes the viscosity of the epoxy matrix resin before it is combined, such as through injecting, to form the admixture comprising the epoxy matrix resin and the soluble thermoplastic polymer toughening material. The initial viscosity is less than 500 cps.

In one embodiment, the injectable epoxy matrix resin does not include a substantial amount of an epoxy curing agent, but rather, the epoxy curing agent is combined with the soluble thermoplastic polymer toughening material, such as a thermoplastic polymer that is in the form of a polymer fiber or veil. Excluding a portion or substantially the entire amount of necessary curing agent from the injectable epoxy matrix resin vastly increases the pot life of the resin in comparison to an injectable matrix resin that contains all or substantially all of the curing agent.

A manufacturing advantage results from the addition of an epoxy curing agent such as 3'3 and/or 4'4 DDS to the soluble thermoplastic polymer toughening material. The manufacturing advantage is an increased processing window of the soluble thermoplastic polymer toughening material because the presence of the epoxy curing agent reduces the processing temperature of the soluble thermoplastic polymer toughening material Therefore, the acceptable processing temperature range between the processing temperature and the degradation temperature of the soluble thermoplastic polymer toughening material beneficially widens. In yet another embodiment, the addition of an epoxy curing agent such as 3'3 and/or 4'4 DDS also surprisingly causes a reduction in the initial dissolution temperature of the soluble thermoplastic polymer toughening material into an epoxy matrix resin, in comparison to the same soluble thermoplastic polymer toughening material not including an epoxy curing agent.

The term "initial dissolution temperature" or "dissolving temperature" as used herein has its ordinary meaning as known to those skilled in the art and includes the temperature at which the soluble thermoplastic polymer toughening material initially dissolves when contacted with an epoxy matrix resin. In one embodiment, the initial dissolution temperature can be reduced by up to about 30° C., such as from about 80° C. to about 50° C. for Cytec KM thermoplastic polymer. In another embodiment, the initial dissolution temperature can be reduced by up to about 25° C., about 20° C., about 15° C., about 10° C., or about 5° C. This reduction in dissolution temperature, and thus dissolution time, can be tailored dependent on the level of the epoxy curing resins such as 3'3 and/or 4'4 DDS included in the fiber.

A soluble thermoplastic polymer toughening material such as a PES/PEES polymer, combined with an epoxy curing agent, such as 3'3 and/or 4'4 DDS, may also aid in the manufacturing of a composite part. The preform for resin infusion may include a carbon fiber structural material in the form of a preform that is stabilized through the use of a thermoplastic veil. A soluble thermoplastic polymer toughening material in the form of a veil that incorporates an epoxy curing agent such as a 3'3 and/or 4'4 DDS will have a reduced melt temperature. As such, the temperature necessary to which the preform must be heated to melt the veil for stabilization is reduced significantly. Furthermore, the soluble thermoplastic polymer toughening material will impregnate further into the carbon fabric than a soluble thermoplastic polymer toughening material that does not comprise the epoxy curing agent.

The term "stability" as used herein has its ordinary meaning as known to those skilled in the art and includes distortion resistance of a preform, and is measured by retained fiber angle and thickness. The stability of a preform is greater using the soluble thermoplastic polymer toughening material comprising an epoxy curing agent as described herein in comparison to the stability of a preform comprising a soluble thermoplastic polymer toughening material without an epoxy curing agent.

The term "stabilization temperature" as used herein has its ordinary meaning as known to those skilled in the art and includes preforming or heat setting. The stabilization temperature is the melt temperature of the soluble thermoplastic polymer toughening material. The present invention, wherein the soluble thermoplastic polymer toughening material incorporates an epoxy curing agent, will have a reduced melt temperature necessary to stabilize the perform.

The term "impregnation" in reference to the impregnation of the toughening agent in the carbon fiber bundle of for example, a preform as used herein, has its ordinary meaning as known to those skilled in the art and refers to the extent of the penetration of the toughening agent between or adjacent to one or more fibers throughout the carbon fiber. Impregnation may be facilitated by the application of one or more of heat and pressure. For example, impregnation of the toughening agent in a preform may be greater than a toughening agent that does not contain an epoxy curing agent.

A "mold" as used herein has its ordinary meaning is known to those skilled in the art and includes, for example, a cavity, die head, or tooling. Generally, during the liquid in fusion process, the mold comprises therein fibers that are wetted with resin that is injected into the mold. In one embodiment, the mold contains the fibers, such as carbon fibers, and the toughening agent.

The terms "approximately, "about," and "substantially" as used herein represent an amount close to the stated amount that still performs the desired function or achieves the desired result. For example, the terms "approximately", "about" and "substantially" may refer to an amount that is within less than 10% of, within less than 5% of, within less than 1% of, within less than 0.1% of, and within less than 0.01% of the stated amount.

The term "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

The term "prepreg" as used herein has its ordinary meaning as known to those skilled in the art such as described above. Prepregs may include sheets or lamina of fibers that have been impregnated with a matrix material within at least a portion of their volume. The matrix may be present in a partially cured state. In one embodiment, the composition does not comprise a prepreg.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within the matrix. Prior to curing, the matrix may further comprise one or more compounds that are, at about room temperature, liquid, semi-solid, crystalline solids, and combinations thereof. In further embodiments, the matrix within the prepreg may be partially cured in order to exhibit a selected stickiness or tack. In certain embodiments, infusing and curing may be performed in a single process.

A "curing agent" as used herein has its ordinary meaning as known to those skilled in the art and may include any thermoset curing agent that acts as a catalyst with a compatible matrix resin. In one embodiment, the curing agent is an epoxy curing agent, as disclosed in EP-A-0 311 349, EP-A-91310167.1, EP-A-0 365 168 or in PCT/GB95/01303, which are incorporated herein by reference, such as an amino compound having a molecular weight up to 500 per amino group, for example an aromatic amine or a guanidine derivative. Particular examples are 3,3'- and 4-,4'-diaminodiphenylsulphone, (available as "3'3 or 4'4 DDS" from commercial sources), methylenedianiline,bis(4-amino-3,5-dimethylphenyl)-1,4diisopropylbenzene (available as EPON 1062 from Shell Chemical Co): bis(4-aminophenyl)-1,4-diisopropylbenzene (available as EPON 1061 from Shell Chemical Co); and 4-chlorophenyl-N,N-dimethyl-urea, e.g., Monuron; 3,4-dichlorophenyl-N,N-dimethyl-urea, e.g., Diuron. In another embodiment, curing agents/catalysts that are not normally compatible (non-miscible) with the polymer can also be included. For example, an epoxy curing agent, such as dicyanodiamide (DICY) (available as "Amicure CG 1200" from Pacific Anchor Chemical), that is not miscible with PES/PEES polymer, may be used when a miscible epoxy curing agent such as 3'3 and/or 4'4 DDS is added to the non-miscible epoxy curing agent, to form a homogeneous blend, which is suitable for fiber formation of the toughening agent.

In one embodiment, a eutectic mix of 3'3 DDS and 4'4 DDS is used as a curing agent, such as in a ratio of 10:90 to 90:10, 20:80 to 80:20, 30:70 to 70:30, 40:60 to 60:40 or about 50:50. Other standard epoxy curing agents such as aliphatic diamines, amides, carboxylic acid anhydrides, carboxylic acids, ureas, and phenols can be used if desired.

An "engineering thermoplastic," "thermoplastic polymer" or "soluble thermoplastic polymer toughening material" as used herein has its ordinary meaning as known to those skilled in the art and may include a polyaromatic polymer. In one embodiment, the polyaromatic polymer comprises same or different repeating units of the formula:

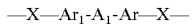

$A_1$ is selected from $SO_2$, a direct link, oxygen, sulphur, —CO— or a divalent hydrocarbon radical;

X is a divalent group as defined for $A_1$, which may be the same or different, or is a divalent aromatic group such as biphenylene; $Ar_1$ is an aromatic divalent group, or multivalent including any one or more substituents R of the aromatic rings. Each R may be independently selected from hydrogen, $C_{1-8}$ branched or straight chain aliphatic saturated or unsaturated aliphatic groups or moieties, optionally comprising one or more heteroatoms selected from O, S, N, or one or more halogens, for example Cl or F groups providing active hydrogen, such as OH, $NH_2$, $NHR_1$—, or —SH, $R_1$— is a hydrocarbon group containing up to eight carbon atoms, or providing other cross-linking activity such as epoxy, (meth) acrylate, cyanate, isocyanate, acetylene or ethylene, as in vinyl, allyl or maleimide, anhydride, oxazoline and monomers containing saturation.

The at least one polyaromatic further comprises reactive pendant and/or end groups, in one embodiment, selected from reactive heteroatom, heteroatom containing or cross-linking groups as discussed above with respect to R.

In one embodiment, the at least one polyaromatic comprises at least one polyaromatic sulphone comprising ether-linked repeating units, optionally additionally comprising thioether-linked repeating units, the units being selected from the group consisting of -(Ph$A_2$Ph)$_n$- and optionally additionally

-(Ph)$_a$- where $A_2$ is CO or $SO_2$, Ph is phenylene, n is a number ranging between 1 to 2 and can be fractional, a is a number ranging between 1 to 4, such as 1, 2 or 3 and, can be fractional. When a exceeds 1, the phenylenes are linked linearly through a single chemical bond or a divalent group other than —CO— or —$SO_2$— or are fused together directly or via a cyclic moiety, such as acid alkyl group, a (hetero) aromatic or cyclic ketone, amide, imide, imine or the like.

In one embodiment, the polyaromatic comprises polyether sulphone, or a combination of polyether sulphone and of polyether ether sulphone linked repeating units, in which the phenylene group is meta- or para-, such as para. The phenylenes are linked linearly through a single chemical bond or a divalent group, other than sulphone, or are fused together. By "fractional", reference is made to the average value for a given polymer chain containing units having various values of n or a.

In one embodiment, the repeating unit -(PhSO$_2$Ph)- is present in said at least one polyarylsulphone in such a proportion that on average at least two of said units -(PhSO$_2$Ph)$_n$- are in sequence in each polymer chain present, said at least one polyarylsulphone having reactive pendant and/or end groups. In other embodiments, the repeating unit -(PhSO$_2$Ph)- is always present in said at least one polyarylsulphone in such a proportion that on average at least two of said units -(PhSO$_2$Ph)- are in sequence in each polymer chain present, said at least one polyarylsulphone having reactive pendant and/or end groups.

Additionally, in the polyarylsulphone polymer, the relative proportions of the repeating units is such that, on average, at least two units of (PhSO$_2$Ph)$_n$ are in immediate, mutual succession in each polymer chain present, such as is in the range of about 1:99 to 99:1, or about 10:90 to 90:10, respectively. Typically the ratio is in the range of about 75-50 (Ph)$_a$, with the balance (PhSO$_2$Ph)$_n$. In one embodiment, polyarylsulphones the units are:

XPhSO$_2$PhXPhSO$_2$Ph("PES") and (I)

X(Ph)$_a$XPhSO$_2$Ph("PEES") (II)

Where X is O or S and may differ from unit to unit. In some embodiments, the ratio of I to II (respectively) is from about 10:90 and 80:20, from about 10:90 and 55:45, from about 25:75 and 50:50, from about 20:80 and 70:30, from about 30:70 and 70:30, or from about 35:65 and 65:35, and a is 1-4.

In one embodiment, the relative proportions of the repeating units of the polyarylsulphone may be expressed in terms of the weight percent SO$_2$ content, defined as 100 times (weight of SO$_2$)/(weight of average repeat unit). In another embodiment, the SO$_2$ content is at least 22, or 23 to 25%.

When a=1, this corresponds to PES/PEES ratio of at least 20:80, or in the range 35:65 to 65:35.

The above proportions may refer only to the units mentioned. In addition to such units, the polyarylsulphone may contain up to 50% molar of other repeating units, such as up to about 25%. The $SO_2$ content ranges, if used, then apply to the whole polymer. Such units may be for example of the formula:

—Ar$_2$-A$_1$-Ar$_2$— in which $A_1$ is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'dihydroxybiphenyl, resorcinol, dihydroxynaphthalene (2,6 and other isomers), 4,4'-dihydroxybenzophenone, 2,2'di(4-hydroxyphenyl)propane and—methane.

If a bis-thiol is used, it may be formed in situ, that is, a dihalide as described for example below may be reacted with an alkali sulphide or polysulphide or thiosulphate. Other examples of such additional units are of the formula:

-Ph-Q(Ar$_2$-Q')$_n$-Ph-

Q and Q', may be the same or different, and are selected from CO or $SO_2$
Ar$_2$ is a divalent aromatic radical that may be selected from phenylene, biphenylene or terphenylene
n is 0, 1, 2 or 3. n is not zero where Q is $SO_2$. Particular units have the formula:

-Ph-Q-[-Ph]$_m$-Q'-]$_n$-Phwhere m is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl)biphenyl, 1,4,bis(4-bis(4-halobenzoyl)benzene and 4,4'-bis(4-halobenzoyl)biphenyl.

They may of course have been, derived partly from the corresponding bisphenols.

The polyaromatic polymer may be the product of nucleophilic synthesis from halophenols and/or halothiophenols. In any nucleophilic synthesis, the halogen, if chlorine or bromine, may be activated by the presence of a copper catalyst.

Such activation is often unnecessary if the halogen is activated by an electron withdrawing group. In any event fluoride is usually more active than chloride. In one embodiment, nucleophilic synthesis of the polyaromatic is carried out in the presence of one or more alkali metal salts, such as KOH, NaOH or $K_2CO_3$ in up to about 10% molar excess over the stoichiometric.

The polymer may be characterized by a range of MW which may typically be defined either by $M_n$, peak MW, and other mechanisms, usually determined by Nuclear Magnetic Resonance (NMR) and Gel Permeation Chromatography (GPC). In one embodiment, the polymer is selected in the range up to 70,000 for example 9000-60,000 for toughening. and in this case the number average molecular weight $M_n$ of the polyaromatic is suitably in the range of about 2000 to 25000. In other embodiments, the number average molecular weight $M_n$ of the polyaromatic is in the range of about 2000 to 20000, 5000 or 7000 to 18000, or 5000 or 7000 to 15000.

In another embodiment, the polyaromatic contains in-chain, pendant, or chain-terminating chemical groups which are capable of self-assembling to form higher molecular weight complexes through non-covalent bonds with similar or different chemical groupings in the polymer. These chemical groupings may be, for example, hydrogen bonds, London forces, charge transfer complexes, ionic links, or other physical bonds. In one embodiment, the non-covalent bonds are hydrogen bonds or London forces which will dissociate in solution to regenerate the relatively low molecular weight precursor polyaromatic.

In a further embodiment, the polyaromatic contains pendant or chain-terminating groups that will chemically react with groups in the thermosetting resin composition to form covalent bonds. Such groups may be obtained by a reaction of monomers or by subsequent conversion of product polymer prior to or subsequently to isolation. In one embodiment, groups are of the formula:

-A'-Y where A' is a divalent hydrocarbon group, such as aromatic, and Y is a group reactive with epoxide groups or with curing agent or with like groups on other polymer molecules. Examples of Y are groups that provide active hydrogen, such as OH, $NH_2$, NHR' or —SH, where R' is a hydrocarbon group containing up to 8 carbon atoms, or providing other cross-linking reactivity such as epoxy, (meth)acrylate, cyanate, isocyanate, acetylene or ethylene, as in vinyl' allyl or maleimide, anhydride, oxazaline and monomers containing saturation. In one embodiment, end groups include amine and hydroxyl.

In one embodiment, the polymer of the flexible polymer element may have low molecular weight, but be adapted to react, on curing, to provide the higher molecular weight required for effective toughening or the like, as disclosed in GB 0020620.1 the contents of which are incorporated herein by reference. This is of particular advantage, since it further alleviates the problems of high viscosity. Specifically, the polymer may comprise chains of at least one aromatic polymer, or a mixture thereof, together with at least one chain linking component.

The at least one aromatic polymer may comprise polymer chains of number average molecular weight ($M_n$) in a first range of about 2000 to 11000, such as about 3000 to 9000 and characterized by a polymer flow temperature. One of the at least one polyaromatic and the at least one chain linking component comprise at least one reactive end group and the other comprises: at least two linking sites reactive end groups Y and chain linking sites, Z are selected, OH, $NH_2$, NHR or SH wherein R is a hydrocarbon group containing up to 8 carbon atoms, epoxy, (meth)acrylate, (iso)cyanate, isocyanate ester, acetylene or ethylene as in vinyl or allyl, maleimide, anhydride, acid, oxazoline and monomers containing unsaturation characterized in that a plurality of the end groups are adapted to react with the linking sites at chain linking temperature in excess of the polymer flow temperature to form linked polymer chains of number average molecular weight (Mn) in a second range of about 9000 to 60000, such as about 11000 to 25000, which is in excess of the first range, substantially thermoplastic in nature.

The term "admixture" as used herein has its ordinary meaning as known to those skilled in the art and may include a combination of materials. In one embodiment, an epoxy curing agent is in an admixture with a thermoplastic. In another embodiment, the admixture of the epoxy curing agent and the thermoplastic comprises the toughening agent. In a preferred embodiment, the toughening agent admixture comprises substantially no epoxy resin. In another embodiment, the toughening agent is in an admixture with the epoxy resin. In an embodiment of the latter admixture, the epoxy resin comprises substantially no toughening agent, engineering thermoplastic and/or epoxy curing agent.

The term "toughening agent" as used herein has its ordinary meaning as known to those skilled in the art and may include thermoplastics and other compounds that toughen composite structures. In one embodiment, the toughening agent comprises an epoxy curing agent. In one embodiment, generally, the toughening agent does not comprise a substantial amount of a resin such as an epoxy resin that is introduced into a preform. In one embodiment, the toughening agent increases the fracture toughness of the resulting composite, by reducing crack propagation and improving impact resistance. Generally, toughness refers to the amount of energy required to cause crack extension in a material when under load, such as the amount of energy per volume that a material can absorb before crack extension.

Generally, impact resistance refers to the relative susceptibility of a composite to fracture under stresses applied at high speeds, which may be measured by an Izod impact test, drop-weight test, or tensile impact test. In one embodiment, impact resistance is illustrated by plotting the absorbed energy in through penetration impact tests as a function of volume fraction of fibers multiplied by thickness—a combination of parameters that yields a master curve for conventional composite systems irrespective of matrix type and detailed fiber orientation (assuming the fibers are arranged in a broadly in-plane isotropy or at worst a 0/90 arrangement). The master curve has been found to hold for materials with very different matrices, including brittle cold cure resins and tough thermoplastic matrices, such as polypropylene. Composites with the toughening aging comprising the thermoplastic in the epoxy curing agent exhibit a surprising increase in toughness as shown by a considerable deviation from the master curve. This is also evidenced by greater damage allotment in the impact specimens.

The terms "matrix", "resin", "epoxy resin" and "matrix resin" as used herein have their ordinary meaning as known to those skilled in the art and may include one or more compounds comprising a thermoset and/or thermoplastic materials. Examples may include, but are not limited to, epoxies, phenolics, phenols, cyanates, imides (e.g., polyimides, bismaleimide (BMI), polyetherimides), polyesters, benzoxazines, polybenzimidazoles, polybenzothiazoles, polyamides, polyamidimides, polysulphones, polyether sulphones, polycarbonates, polyethylene terepthalates, and polyether ketones (e.g., polyether ketone (PEK), polyether ether ketone (PEEK), polyether ketone (PEKK) and the like), combinations thereof, and precursors thereof. In one embodiment, the epoxy resin contains substantially no toughening agent.

In one embodiment, the resin is a single part epoxy resin system. In another embodiment, the resin is a low viscosity, single part epoxy resin. In another embodiment, the resin has a very high viscosity at room temperature but has a low viscosity and long pot life at an elevated temperature. In this case, the high viscosity of the resin may prohibit the flow of resin into the preform at room temperature. Thus, during the process, the resin may be heated to a temperature that would melt the resin to a low viscosity and allow the resin to flow into the preform.

The term "infusing" as used herein has its ordinary meaning as known to those skilled in the art and may include the introduction of a resin into a preform. In one embodiment, infusing a resin may include mechanically driving the resin into the preform by atmospheric pressure through creating a vacuum within the preform. In another embodiment, infusing may take place by applying one or more of heat and external pressure. The application of heat or pressure promotes passage of the resin from the reservoir to the preform. In one embodiment, infusion occurs at a resin temperature from about 65° C. In another embodiment, the infusion occurs at a resin temperature of about ambient temperature.

The term "preform" or "fiber preform" as used herein has its ordinary meaning as known to those skilled in the art and may include an assembly of fibers, such as unidirectional fibers and woven fabrics, that are is ready for receiving resin.

The term "composites" as used herein each has its ordinary meaning as known to those skilled in the art such as described above. Composites may be formed from a plurality of prepregs. Prepregs may be consolidated into composites by applying at least one of heat, vacuum, and external pressure. In one embodiment, the composite has a fiber content of at least 55%, and in other embodiments 60% or greater, 65% or greater, 70% or greater, 75% or greater, 80% or greater on the basis of the total volume of the composite. The process may yield composites having high fiber volumes and low void contents that meet or exceed those of conventional composites manufactured in an autoclave. The resulting composites can be used in applications including, but not limited to, aerospace applications.

The term "room temperature" or "ambient temperature" as used herein has its ordinary meaning as known to those skilled in the art and may include temperatures within the range of about 16° C. (60° F.) to 32° C. (90° F.), for example at about 25° C.

The term "fiber" as used herein has its ordinary meaning as known to those skilled in the art and may include one or more fibrous materials adapted for the reinforcement of composites. Fibers may take the form of any of whiskers, short fibers, continuous fibers, sheets, plies, and combinations thereof. Continuous fibers may further adopt any of unidirectional, multi-dimensional (e.g., two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, silicon carbide, polyamide, carbon, and graphite, and combinations thereof. In one embodiment, the fiber is carbon, fiberglass, aramid or other thermoplastic materials. The reinforcing fibers may be organic or inorganic. Further, the fibers may include textile architectures including those that are either continuous or non-continuous in form.

In one embodiment, the toughening agent and or the thermoplastic is in the form of a fiber. The fiber may further be in the form of a veil, such as a non-woven veil, which is described in U.S. Pat. No. 6,902,800, and which is incorporated herein by reference.

The term "layup" as used herein has its ordinary meaning as known to those skilled in the art and may include one or more plies that are placed adjacent one another. In certain embodiments, the plies within the layup may be positioned in a selected orientation with respect to one another. In a further embodiment, the plies may optionally be stitched together with a threading material in order to inhibit their relative motion from a selected orientation. In additional embodiments, "layups" may comprise any combination of fully impregnated plies, partially impregnated plies, and perforated plies as discussed herein. Layups may be manufactured by techniques that may include, but are not limited to, hand layup, automated tape layup (ATL), advanced fiber placement (AFP), and filament winding.

The term "consolidation" as used herein has its ordinary meaning as known to those skilled in the art and thus includes processes in which the resin or matrix material flows so as to displace void space within and adjacent fibers. For example, "consolidation" may include, but is not limited to, flow of matrix into void spaces between and within fibers and plies, perforations, and the like. "Consolidation" may further take place under the action of one or more of heat, vacuum, and applied pressure.

The term "liquid infusion processing" as used herein has its ordinary meaning as known to those skilled in the art and may include conventional liquid infusion processing. The liquid infusion process may include any process by which the reinforcing fibers are first placed into a mold cavity, die head, or any other means of net shaped tooling in a dry condition and then wetted with the resinous matrix and then cured.

This process can be accomplished with many different processing strategies including RTM, RH, VARTM, RTM Light, pultrusion, SCRIMP, RIM, SQUIRTM, and a host of other processes that are variations of the liquid infusion process. Each of these conventional processes has advantages and disadvantages. The primary difference between most of the processes relate to the precision and the cost of the tooling and the way in which the resin is presented to the preform.

For conventional RTM and the closed mold processes, procuring and maintaining the tooling is expensive, however tooling is the most central part of that process. The mechanism determines the final shape and surface control of the component and also plays an active role in determining how the resin fills and wets out the dry fibers enclosed within it. Conventionally, there are constraints on the size and shape of the components made with these closed mold processes as tooling becomes unmanageable. In addition to the tooling, the conventional equipment needed to inject resin at temperature and a high pressure, such as 3-25 bar, presses and injection machines can also be very expensive to buy and maintain. There are some variations within the closed mold processes that utilize lower cost tooling and eliminate the resin injection systems but in general they are more expensive than the other liquid infusion processes. These processes, however, generally yield the required high fiber volumes and minimal void required of aerospace grade laminates.

Liquid infusion processing also includes a single sided liquid infusion process which is a variation of the closed mold process. Instead of a 2 sided tool, a single sided tool is used in this process with a flexible bag used on the opposite side. This process is a low cost version of the closed mold process because it only requires a single sided mold, requires minimal additional equipment to support the process, and has very few constraints. The process utilizes vacuum (atmospheric pressure) alone to feed and fill the resin wetting the dry fibers. By using low viscosity resinous materials and proper infusion techniques which maintain vacuum pressure on the laminates, aerospace grade laminates can be manufactured.

Another conventional liquid infusion process is pultrusion, which is very restricted compared to the other liquid infusion processes. The method of pultrusion comprises introducing dry fibers into a die with a certain cross section and then once in place introducing resin and then curing. This process is typically used to fabricate long, continuous component that have a typical/constant cross section.

The conventional single sided liquid infusion method described above which relies on vacuum (e.g., atmospheric pressure) alone to feed and wet the dry fibers is discussed below in more detail. Conventional liquid infusion of dry fibers using vacuum (atmospheric pressure) as the primary force in feeding and wetting the dry fibers of a preform is well known within the industry. There are numerous patents that have been awarded around this process starting with the Marco method (U.S. Pat. No. 2,495,640) and Smith (U.S. Pat. No. 2,913,036) which were first used in the 1940's and 50's up to more recent patents from Palmer (U.S. Pat. No. 4,942,013) and Seeman (U.S. Pat. No. 4,902,215). There are also numerous variations to the process that have been detailed in technical presentations and journals that describe methods of introducing and distributing the resin into the dry fibers.

EXAMPLES

KM/3'3 or 4'4 DDS fibers were prepared in a rudimentary manner on a PRISM extruder with an approximately 25:1 L/D barrel, about 0-300 RPM screw speed, about 0.75 kW motor, barrel temperature up to about 400° C. and pressure range of about 0-100 bar. The ratios examined ranged from about 25% by wt DDS up to about 45% wt DDS with the remainder being KM polymer. PES/DDS fibers were prepared with about 25% DDS. KM/DDS/DICY fibers were also prepared with ratios of about 68% KM, 24% DDS, 8% DICY. Blends of DICY and KM were ineffective as the DICY phase separated out of the polymer.

Figure 2:
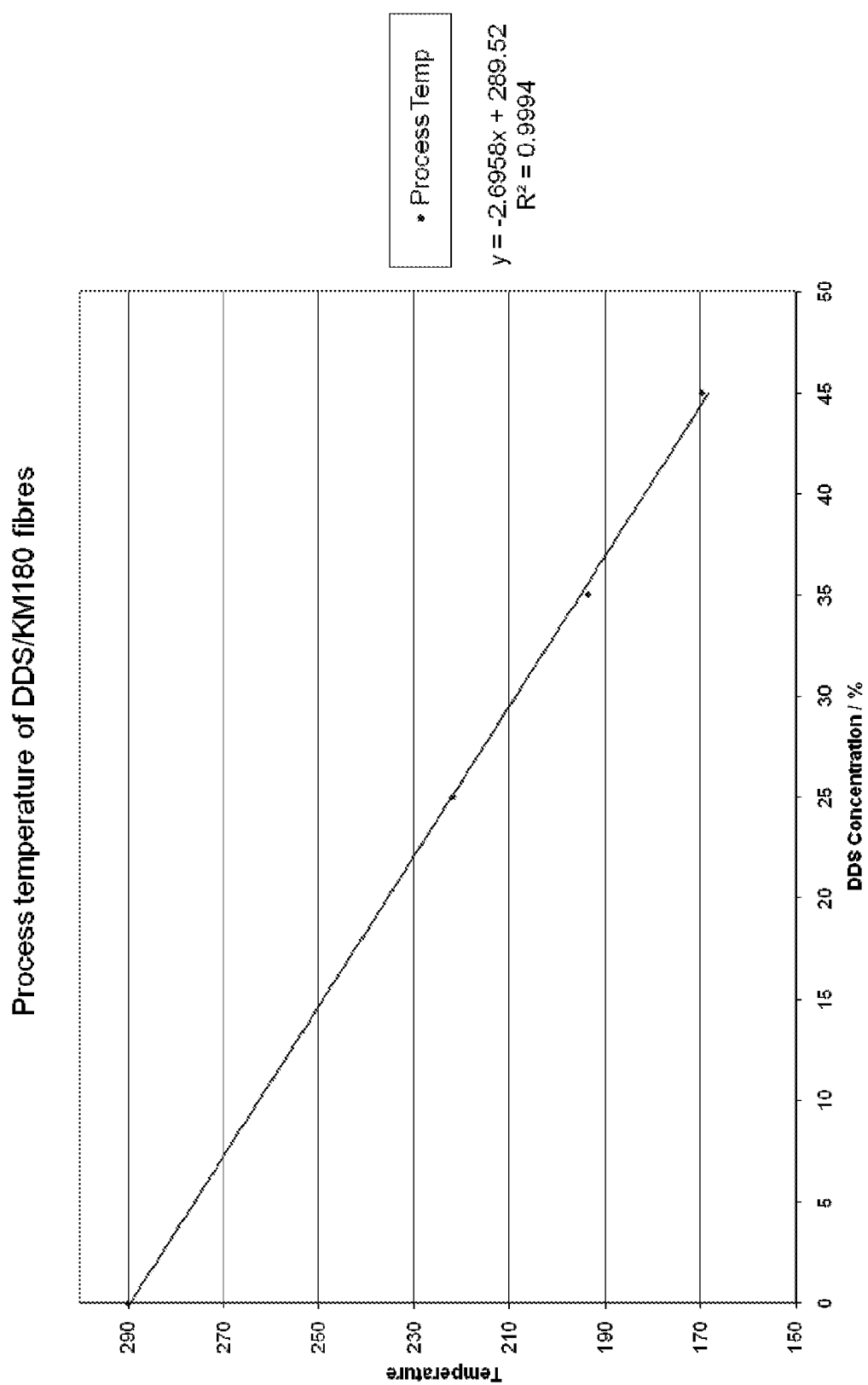
FIG. 2 is a chart depicting the substantially linear relationship between process temperature in ° C. versus fiber composition in fibers comprising a 50:50 eutectic blend of 3'3 and 4'4 DDS and KM 180 PES:PEES copolymer.
Figure 3:
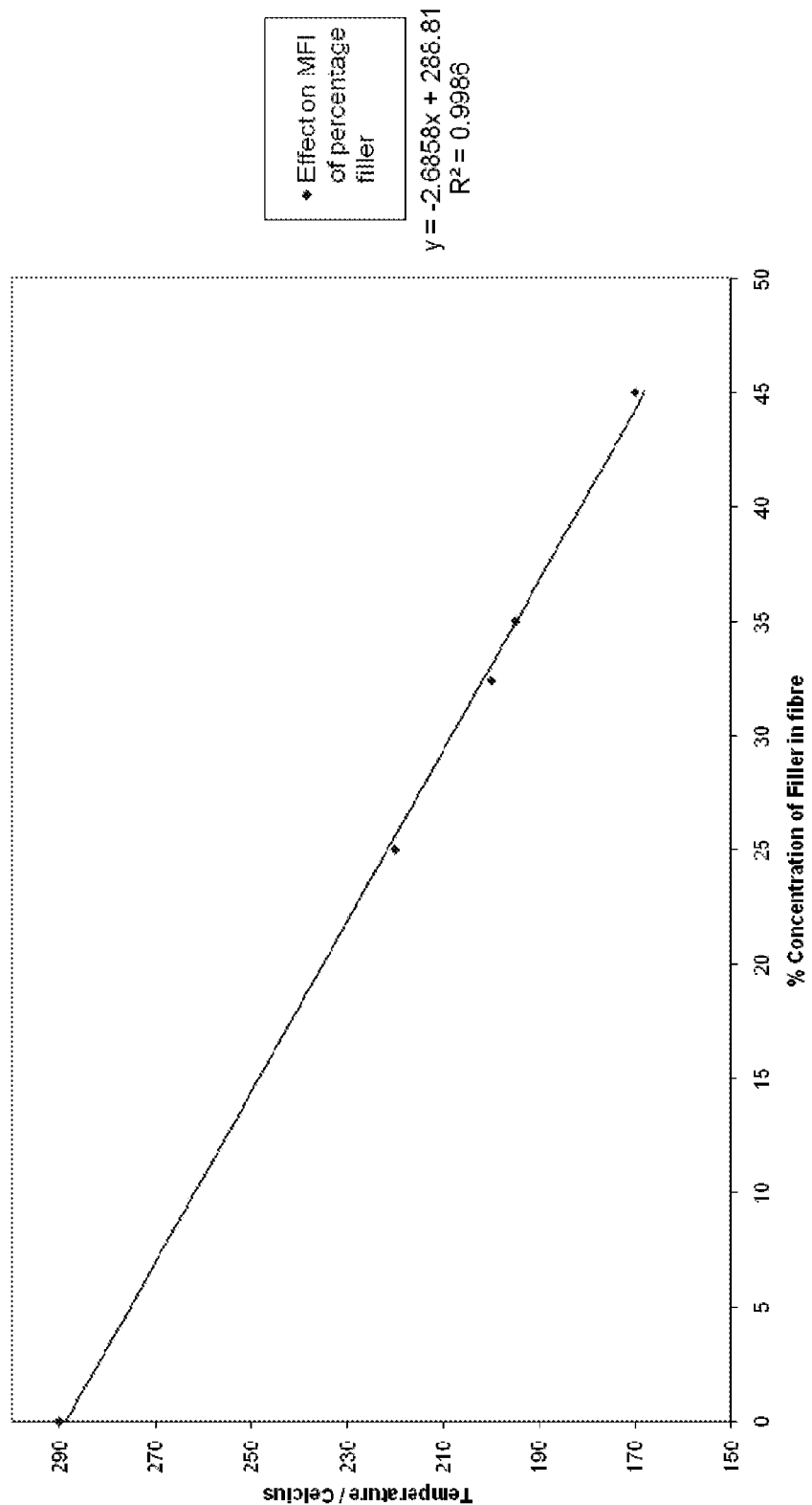
FIG. 3 is a chart depicting the substantially linear relationship between process temperature in ° C. versus the percent concentration of filler by weight in a composition of fibers comprising a 50:50 eutectic blend of 3'3 and 4'4 DDS and/or DICY and KM 180 PES:PEES copolymer.
Figure 4:
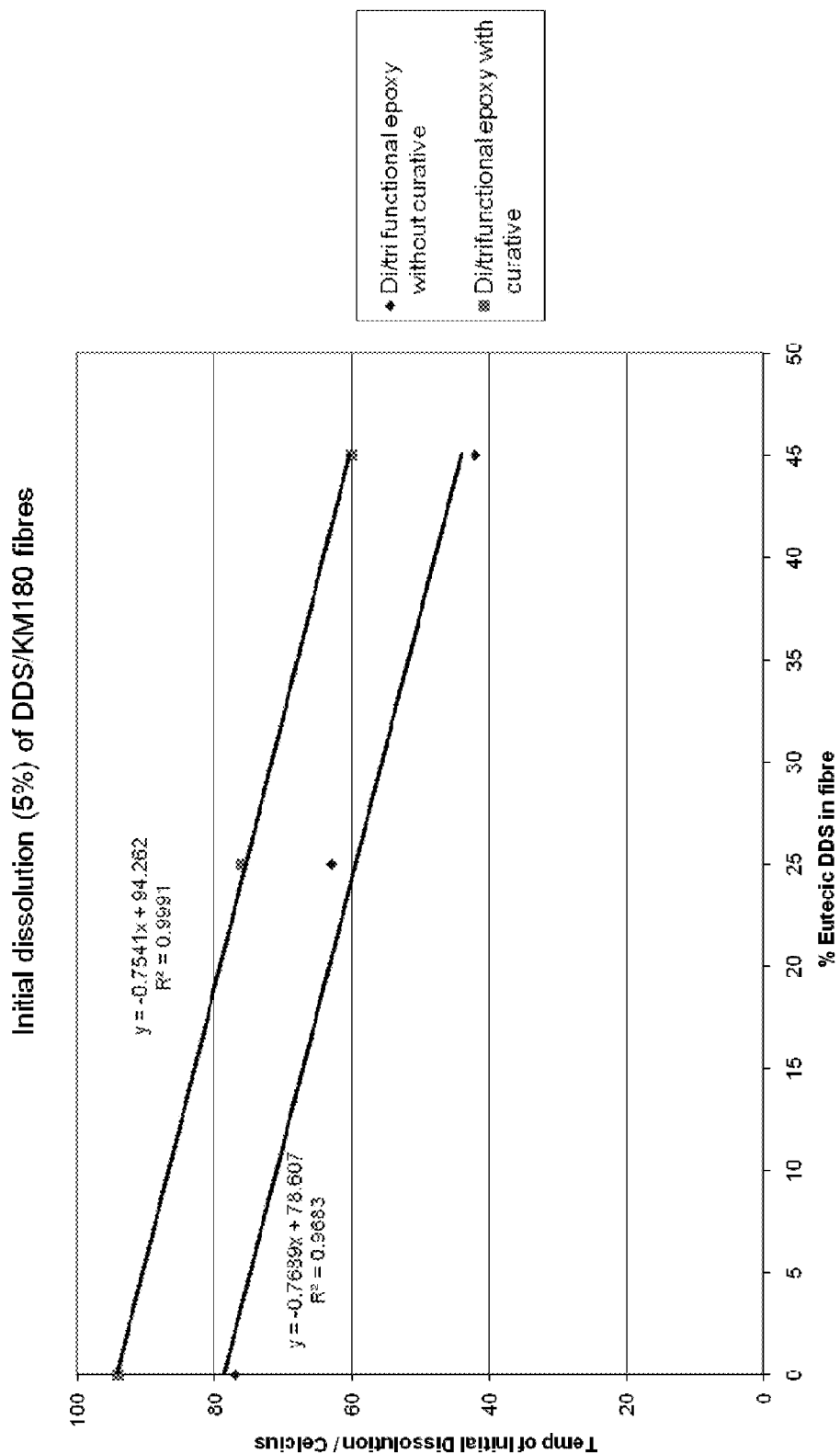
FIG. 4 is a chart depicting the substantially linear relationship between the temperature of initial dissolution in ° C. and the composition by weight of a fibre comprising a 50:50 eutectic blend of 3'3 and 4'4 DDS and KM 180 PES:PEES copolymer in a blend of di/tri functional epoxy resin both with and without curative.
Figure 5:
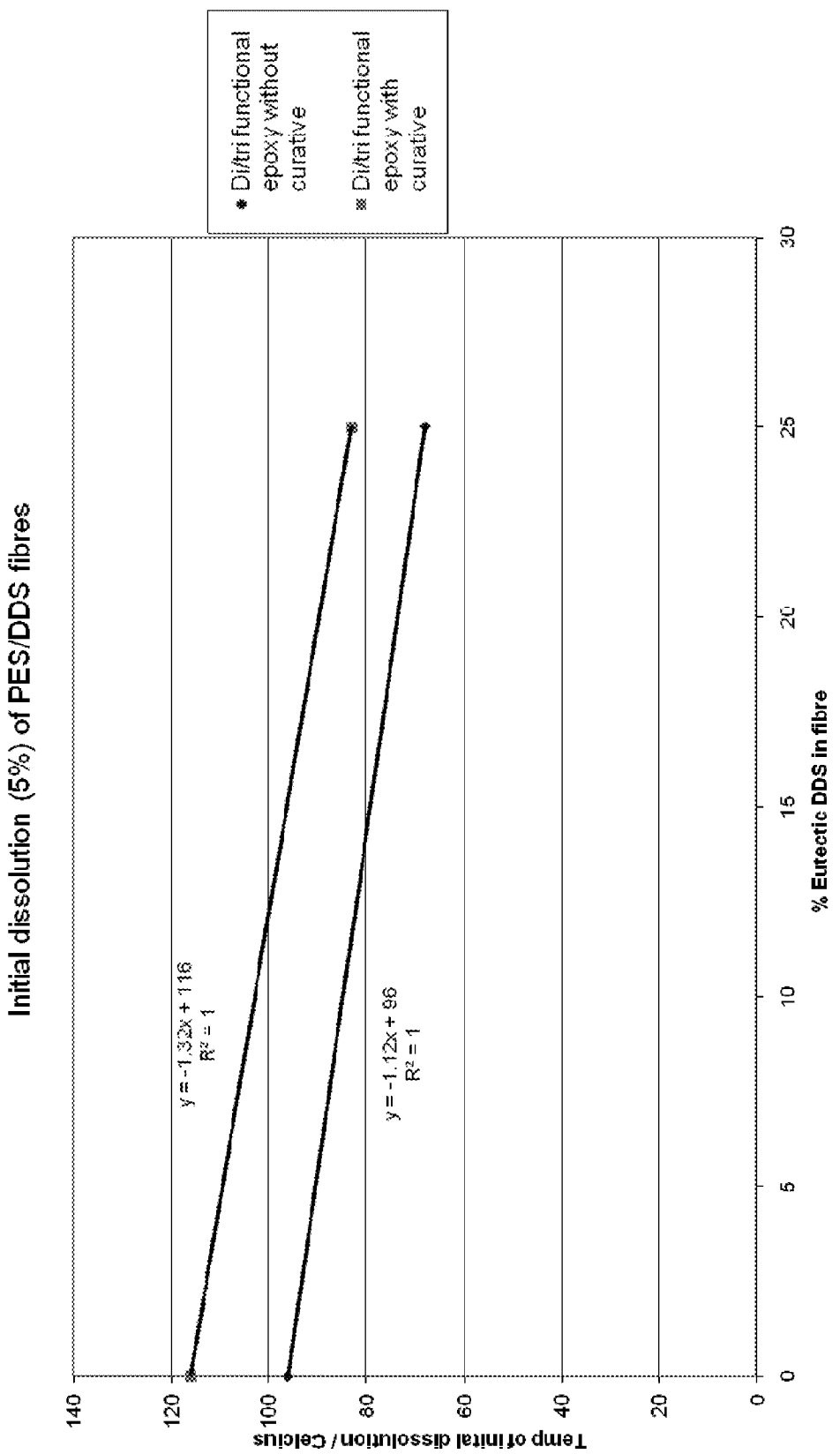
FIG. 5 is a chart depicting the substantial linear relationship between the temperature of initial dissolution in ° C. and the composition by weight of a fibre comprising a 50:50 eutectic blend of 3'3 and 4'4 DDS and PES in a blend of di/tri functional epoxy both with and without curative.
Figure 6:
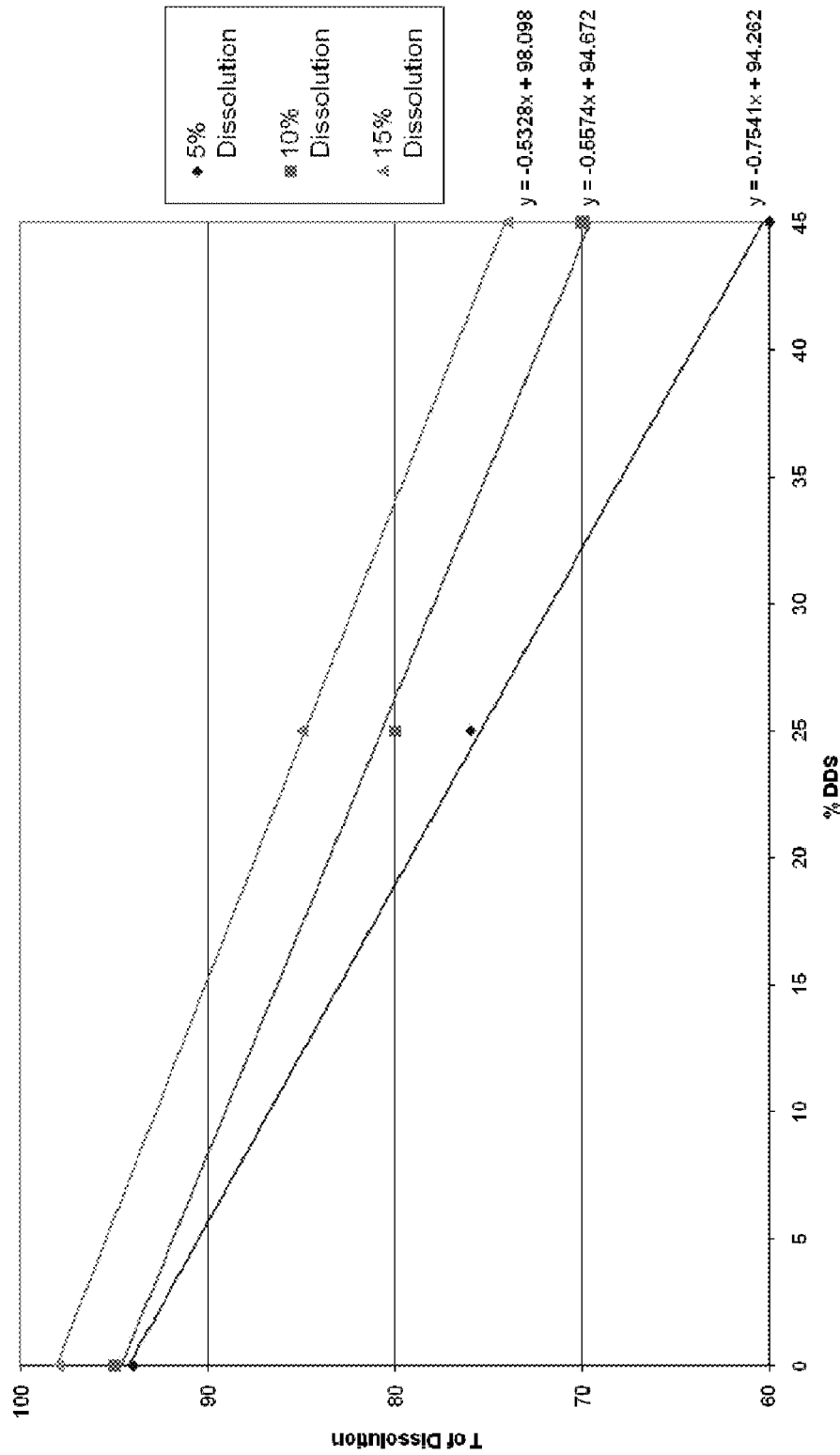
FIG. 6 is a chart depicting the substantial linear relationship between the temperature of dissolution in ° C. and the composition by weight of a fibre comprising a 50:50 eutectic blend of 3'3 and 4'4 DDS and KM 180 PES:PEES copolymer in a blend of di/tri functional epoxy with curative at 5%, 10%, and 15% dissolution.
Figure 7:
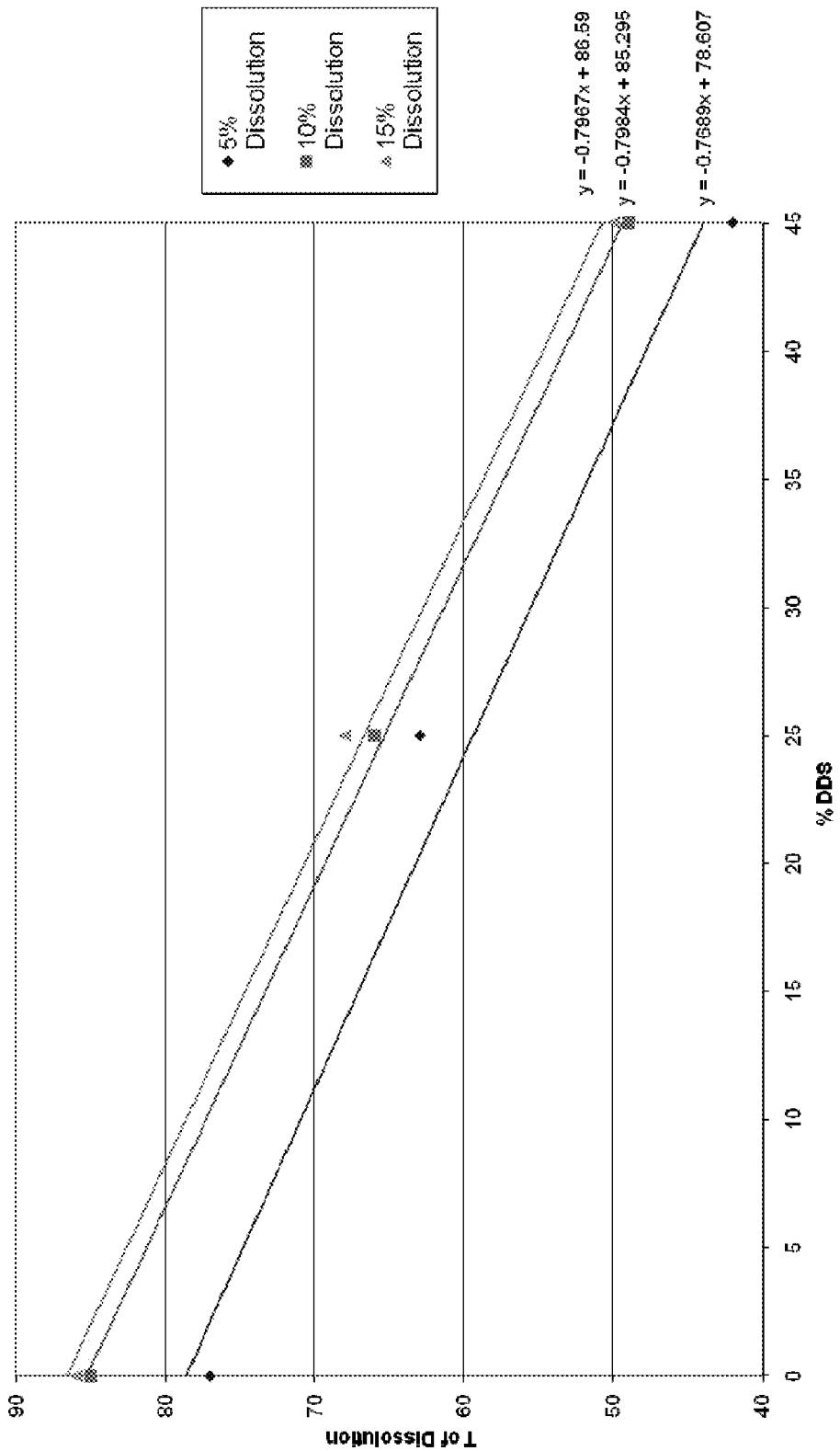
FIG. 7 is a chart depicting the substantial linear relationship between the temperature of dissolution in ° C. and the composition by weight of a fibre comprising a 50:50 eutectic blend of 3'3 and 4'4 DDS and KM 180 PES:PEES copolymer in a blend of di/tri functional epoxy without curative at 5%, 10%, and 15% dissolution.
Figure 8:
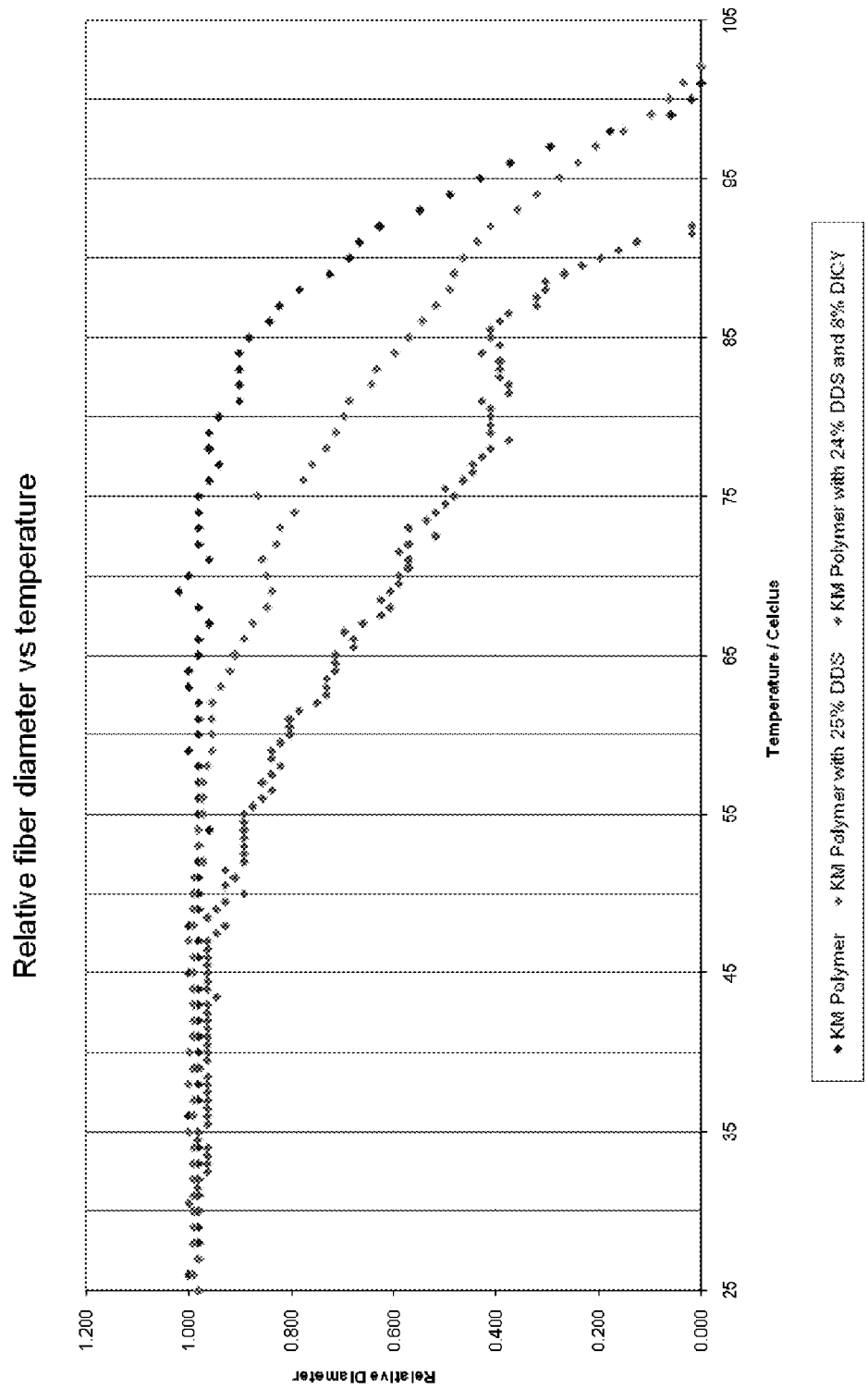
FIG. 8 is a chart depicting a dissolution comparison of fibers comprising KM 180 PES:PEES copolymer, KM 180 PES:PEES copolymer with 25% of a 50:50 eutectic blend of 3'3 and 4'4 DDS and KM 180 PES:PEES copolymer with 24% of a 50:50 eutectic blend of 3'3 and 4'4 DDS and 8% DICY in a blend of di/tri functional epoxy without curative, showing the relative diameter of the thermoplastic fiber versus temperature in ° C.
Figure 9:
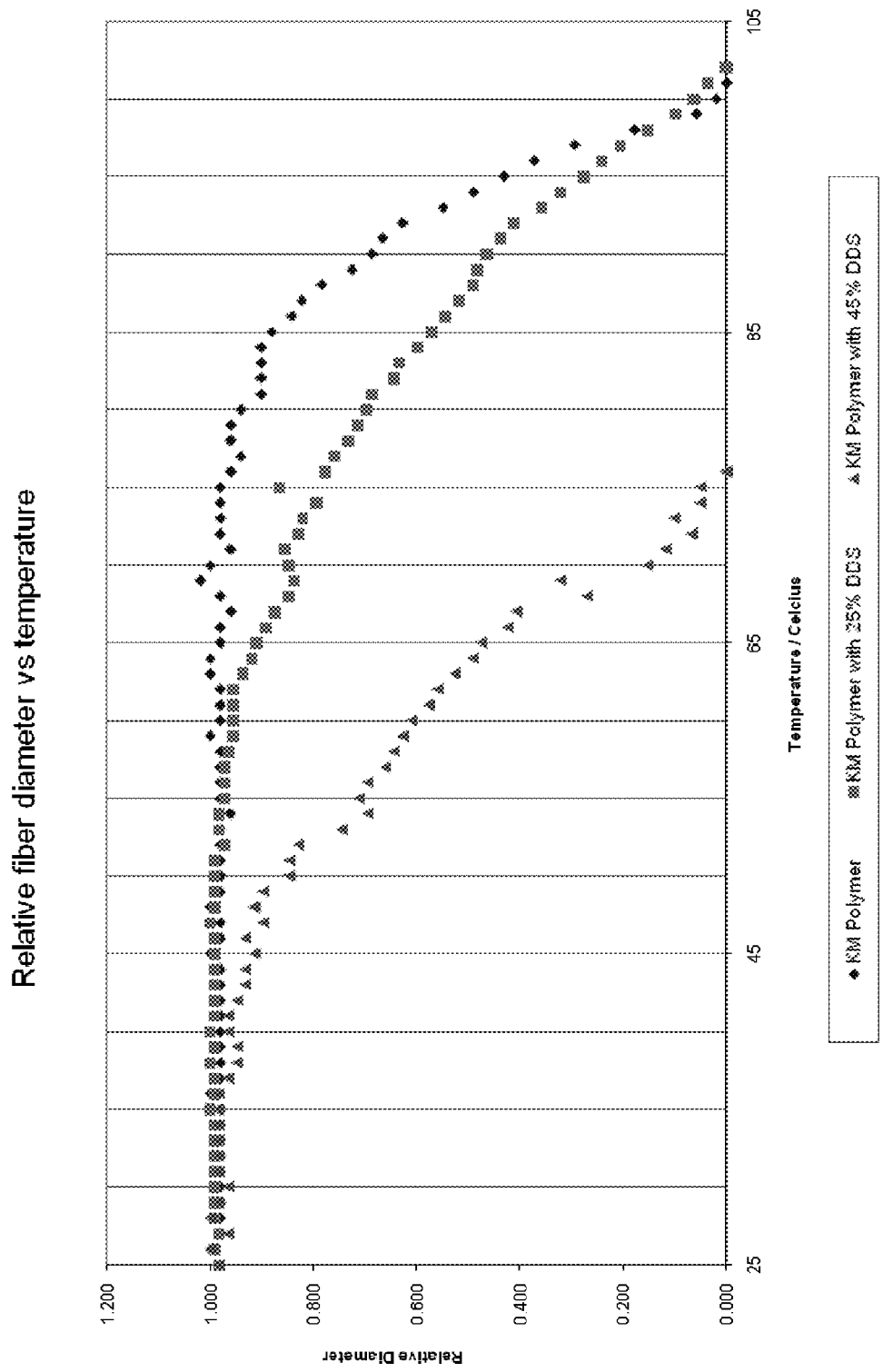
FIG. 9 is a chart depicting a dissolution comparison of fibers comprising KM 180 PES:PEES copolymer, KM 180 PES:PEES copolymer with 25% of a 50:50 eutectic blend of 3'3 and 4'4 DDS and KM 180 PES:PEES copolymer with 45% of a 50:50 eutectic blend of 3'3 and 4'4 DDS in a blend or di/tri functional epoxy without curative, showing the relative diameter of the thermoplastic fiber versus temperature in ° C.

The fibers were prepared using a laboratory scale extruder at extrusion temperatures of from about 170° C. and 290° C. Upon increasing the amount of DDS in the system, the processing temperature was reduced (pure KM polymer was processed around about 290° C., 45% DDS was processed at around about 170-180° C., 75% PES/25% DDS was processed at about 250° C. to 290° C. and the DICY containing formulations was processed at from about 150° C. and 200° C. (to prevent degradation). See FIG. 2, for example.

Example 1

Preparation of 25% DDS/KM

A powder premix of about 25% curing agent (50:50 mix of 3'3 and 4'4 DDS) and 75% KM polymer was prepared and vigorously mixed before addition to the extruder hopper. The five heating zones in the extruder were set to about 230° C. below the hopper and another 4 zones along the barrel were set to about 240° C. The die head temperature was about 231° C. with the twin screws set to about 3 RPM, which gave a negligible back pressure. Wind up speed on the bobbin was set to about 280 RPM which ensured that the fibers were drawn to a suitable diameter. The collected fibers were then examined under optical microscopy to check for voids, homogeneity of the fiber diameter or any inclusions.

Example 2

Preparation of 68% KM, 24% 3'3/4'4 DDS, 8% DICY

The eutectic mix of 50:50 3',3:4'4 DDS and DICY (melt blended) coarse powder was added to KM polymer and placed in the hopper of the extruder. The heating zones in the extruder were set to 150° C. below the hopper, then about 190° C., 200° C., 200° C. and 200° C. (going from hopper to dye). The dye temperature was about 195° C. with the twin screws set to about 12 RPM. The back pressure on the system was at about 23 PSI and the wind up speed of the bobbin was set to about 800 RPM. The resulting soluble thermoplastic polymer toughening material fibers were then examined under optical microscopy to check for voids, homogeneity of the fiber diameter or any inclusions.

Initial fibers produced on these machines were about 40 to 140 microns in diameter, which is larger than normal commercially produced fibers.

Dissolution studies on the soluble thermoplastic polymer toughening material fibers showed that as the level of 50:50 3',3:4',4 DDS mix increased the initial dissolution temperature of the fibers in a given epoxy resin system decreased, dropping the dissolution temperature from about 20-35° C. for an approximately 45% loading of the DDS mix. There was an approximately linear drop in the dissolution temperature with increasing content of the DDS mix. The dissolution studies were performed by placing KM fibers in an epoxy resin, heating the resin and measuring the fiber diameter with a microscope as the fiber dissolve. See FIGS. 4-9, for example.

The process was also trialed in the preparation of non-woven mats. This trial was expected to mitigate the reduced mechanical properties of the KM/DDS containing fibers (as thinner fibers are generally less brittle), Trials were carried out using KM polymer and the 4'4-DDS, 3'3-DDS and a 50:50 blend of 3'3 and 4'4-DDS. The amount of DDS included was set to 40% to match to other commercial systems.

Process Description

The KM 180 polymer was pelletized with DDS (KM with 3'3-DDS and KM polymer with 4'4-DDS) to make a feedstock for the non-woven process. Optimization of the process was completed to give a homogeneous blend of the two components. Standard conditions involved the temperature profile of the veil extruder to be 280° C. at the hopper falling to about 150° C. at the die. The process used a single strand die and vented barrel to reduce gas pockets in the barrel and melt.

The non-woven materials were then prepared using the two feed stocks to make a variety of veils containing differing ratios of 3'3 and 4'4-DDS. Temperature profiles were from about 320° C. to about 420° C. with spinneret die diameters of 0.018 to 0.025 in. The number of die holes was about 120 and the air temperature at the die head was around about 400-460° C. at about 10-25 psi. These veils were then calendared to increase their mechanical properties.

Stabilization of a preform with a soluble thermoplastic polymer toughening material is commonly used and examination of the non-woven veils containing DDS showed a significant drop in stabilization temperatures and times. Standard stabilization processes see a stabilization temperature of about 160° C. for about 5 h although with the veil containing 40% DDS the temperature required was about 140° C. for about 15 min.

An additional benefit of the DDS containing soluble thermoplastic polymer toughening material was that the impregnation into the fabric was greatly increased leaving a thinner ply thickness to the resulting material. The level of the impregnation in this case was so great that the preform became stiff and boardy but lowering the level of DDS to around 10% has given well impregnated perform with good handleability.

It is known that those skilled in the art will recognize that variations can be made to the invention and the examples. The described methods, compositions and examples provided in this document do not limit the invention to those methods and the basic concept applies to all potential modifications. The invention is not limited to any group of processes and is applicable to all liquid infusion methods.

What is claimed is:

1. A thermoplastic polymer toughening material in the form of polymeric fibers produced by mixing at least one epoxy curing agent and a thermoplastic polyaromatic polymer to form an admixture, and producing polymeric fibers therefrom, wherein said thermoplastic polymer toughening material does not comprise an epoxy resin, and is soluble in an epoxy resin at a temperature lower than a dissolving temperature required by the thermoplastic polymer toughening material without the epoxy curing agent.

2. The thermoplastic polymer toughening material of claim 1, wherein the polyaromatic polymer comprises $XPhSO_2PhXPhSO_2Ph(PES)$, or $X(Ph)_aXPhSO_2Ph(PEES)$, or both, wherein X is O or S, Ph is phenylene, and a is 1-4.

3. The thermoplastic polymer toughening material of claim 1, wherein two different epoxy curing agents are mixed with the thermoplastic polyaromatic polymer to form an admixture, wherein one of the epoxy curing agents is non-miscible with the thermoplastic polyaromatic polymer without the presence of the other epoxy curing agent, which is miscible with the thermoplastic polyaromatic polymer.

4. The thermoplastic polymer toughening material of claim 1, wherein the polyaromatic polymer is a co-polymer of PES and PEES.

* * * * *